US008831629B2

(12) United States Patent
Meredith et al.

(10) Patent No.: US 8,831,629 B2
(45) Date of Patent: Sep. 9, 2014

(54) SYSTEM AND METHOD FOR IDENTIFYING MOBILE COMMUNICATION DEVICES

(75) Inventors: Sheldon Meredith, Marietta, GA (US); Jeremy Fix, Acworth, GA (US); Mario Kosseifi, Roswell, GA (US)

(73) Assignee: AT&T Intellectual Properties I, L.P., Atlanta, GA (US)

( * ) Notice: Subject to any disclaimer, the term of this patent is extended or adjusted under 35 U.S.C. 154(b) by 55 days.

(21) Appl. No.: 13/308,253

(22) Filed: Nov. 30, 2011

(65) Prior Publication Data

US 2013/0137451 A1 May 30, 2013

(51) Int. Cl.
*H04W 24/00* (2009.01)
(52) U.S. Cl.
USPC ..... 455/456.1; 455/410; 455/411; 455/456.2; 455/456.3; 455/456.5
(58) Field of Classification Search
CPC ..... H04W 12/08; H04W 12/06; H04W 12/00; H04W 64/00; H04W 84/12; H04W 48/16; H04W 84/045; H04W 8/16
USPC .............. 370/310.2, 328, 338, 351–356, 400, 370/401; 455/404.2, 410, 411, 415, 422.1, 455/435.1, 440, 456.1, 456.2, 456.3, 456.5
See application file for complete search history.

(56) References Cited

U.S. PATENT DOCUMENTS

| | | | |
|---|---|---|---|
| 7,646,854 B2 | 1/2010 | Anderson | |
| 2003/0216143 A1* | 11/2003 | Roese et al. | 455/456.1 |
| 2004/0002343 A1* | 1/2004 | Brauel et al. | 455/456.1 |
| 2004/0156372 A1* | 8/2004 | Hussa | 370/401 |
| 2004/0198392 A1* | 10/2004 | Harvey et al. | 455/456.1 |
| 2004/0203359 A1* | 10/2004 | Sasai et al. | 455/41.1 |
| 2007/0255740 A1* | 11/2007 | Lavin | 707/101 |
| 2008/0274752 A1 | 11/2008 | Houri | |
| 2010/0083364 A1* | 4/2010 | Fernandez Gutierrez | 726/13 |
| 2010/0291906 A1* | 11/2010 | DeLuca et al. | 455/414.1 |
| 2011/0057789 A1 | 3/2011 | Cai et al. | |
| 2011/0201305 A1* | 8/2011 | Buer et al. | 455/410 |

* cited by examiner

*Primary Examiner* — Dinh P Nguyen
(74) *Attorney, Agent, or Firm* — Toler Law Group, PC

(57) ABSTRACT

A method includes detecting, at a device coupled to a network, a communication transmitted over the network. The method includes determining whether the communication is associated with an unauthorized data request, and, in response to determining that the communication is associated with the unauthorized data request, determining an access point associated with a source of the communication. The method further includes transmitting a message to a service provider. The message may request identification of mobile communication devices that are located within a threshold distance of the access point.

23 Claims, 9 Drawing Sheets

Unauthorized Data Request Database 400

| Unauthorized Data Request Type 402 | Identifier 404 | Notification 406 |
|---|---|---|
| URL Access 416 | URL1 418 | P1 420 |
| Data Transfer 422 | DS2 424 | P1, P2 426 |
| Data Transfer 428 | DF3 430 | P4 432 |
| Data Transfer 434 | DF4 436 | P3 438 |

Proximity Association Database 500

| Unauthorized Data Request Identifier 502 | Proximate Mobiles 504 | Timestamp 506 | Location 508 | Correlation Data 510 |
|---|---|---|---|---|
| URL1 522 | M1, M2, M3, M4 524 | T1 526 | L1 528 | CD1 530 |
| URL1 532 | M4, M7, M9 534 | T2 536 | L1 538 | CD2 540 |
| DS2 542 | M5, M9, M10 544 | T3 546 | L2 548 | CD3 550 |
| DS2 552 | M10, M11, M12, M14 554 | T4 556 | L3 558 | CD4 560 |
| URL2 562 | M13, M15, M16 564 | T2 566 | L4 568 | CD5 570 |

SYSTEM AND METHOD FOR IDENTIFYING MOBILE COMMUNICATION DEVICES

FIELD OF THE DISCLOSURE

The present disclosure is generally related to identification of mobile communication devices near a location.

BACKGROUND

Users are increasingly connecting to the internet using public access points. Many public access points do not require a user to provide identifying information, such as a user name or password, when the user connects an electronic device to the access point (e.g., a personal computing device or cell phone having a wireless connection to a wireless access point). When many users simultaneously access a network, such as the internet, from a public access point, it may be difficult to associate network behavior related to transmissions of the access point to any particular user or electronic device.

For example, when an electronic device that is connected to the public access point is used to conduct an unauthorized action, it may be difficult to identify the owner or user of the electronic device. Some public access points temporarily store information, such as a media access control (MAC) address, for each electronic device that connects to the public access point. When an electronic device terminates the connection with the public access point, the information stored at the public access point (e.g., a MAC address of the electronic device) may be subsequently overwritten as connections between the public access point and other electronic devices are established. Additionally, even though it may be possible to locate the public access point and extract the MAC addresses stored thereon, it may be difficult to identify the user that initiated the unauthorized action based on the MAC address.

BRIEF DESCRIPTION OF THE DRAWINGS

FIG. 4 illustrates a particular embodiment of a database for use in identifying mobile communication devices near a location;

FIG. 5. illustrates another embodiment of a database for use in identifying mobile communication devices near a location s;

DETAILED DESCRIPTION

Figure 1:
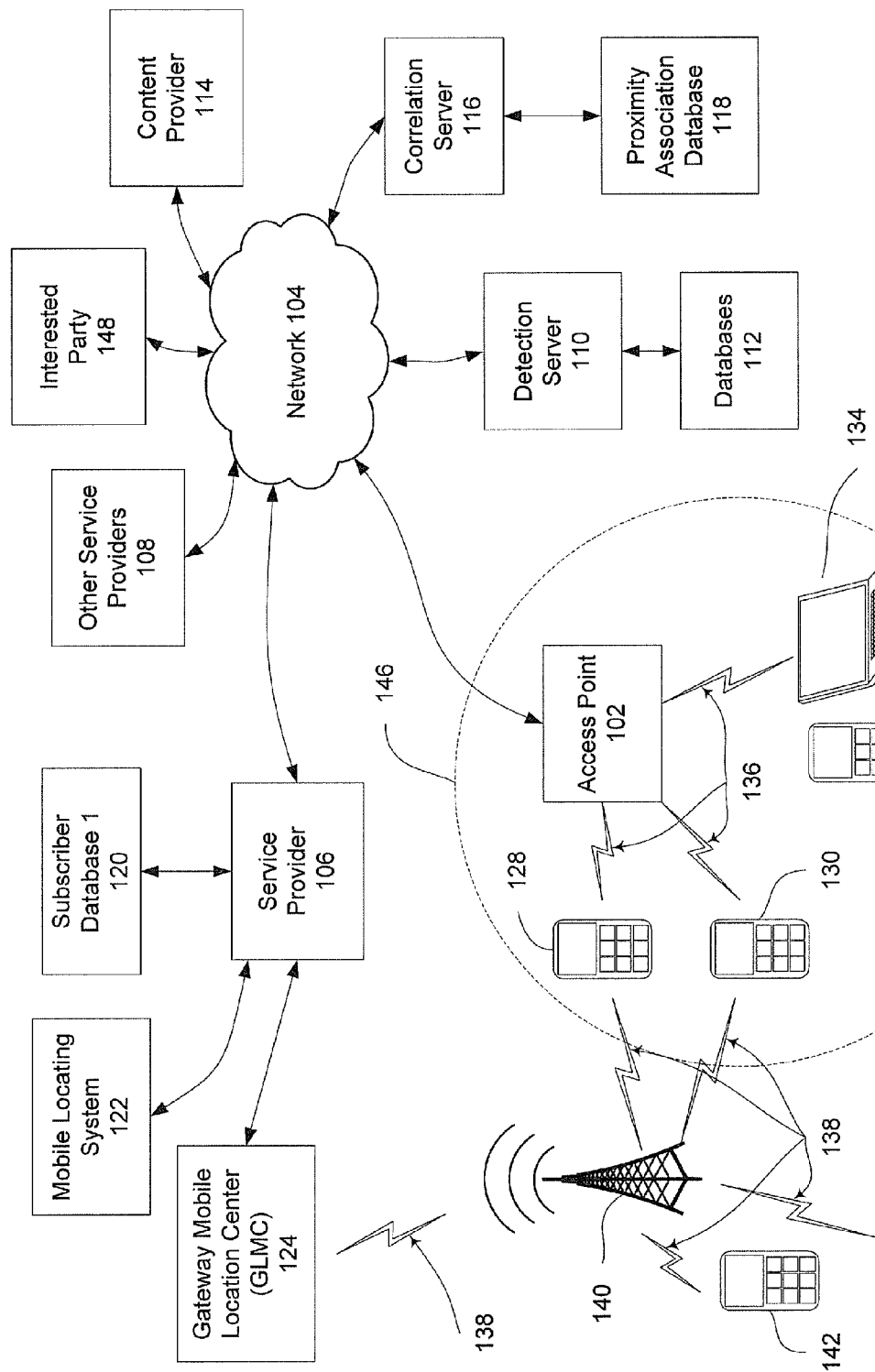
FIG. 1 is a block diagram of an illustrative embodiment of a system to identify mobile devices.

Systems and methods to identify mobile devices located proximate to an access point are disclosed. The disclosed systems and methods may also enable identification of a subscriber associated with an identified mobile communication device. To illustrate, a user may access a network using an electronic device (e.g., a personal computing device or a mobile communication device) connected to an access point. The user may send an unauthorized data request (e.g., an unauthorized download or webpage access request) to a content provider (e.g., a website) via the network. The unauthorized data request may be detected by a detection server coupled to the network. The detection server may send a request to a mobile communication service provider to identify mobile communication devices located proximate to the access point at or near the time of the unauthorized data request. Numerous mobile communication devices may be identified as proximate to one or more access points in response to numerous requests from the detection server. Each request may correspond to a different unauthorized data request detected by the detection server. Information associated with the identified mobile communication devices may be stored at a correlation server. The information associated with the identified mobile communication devices may include an identifier associated with an unauthorized data request detected at the detection server. The correlation server may generate correlation data that indicates that a particular mobile communication device was identified as being located proximate to one or more access points when multiple unauthorized data requests occurred. The correlation data may indicate that a subscriber associated with the mobile communication device initiated at least some of the multiple unauthorized data requests.

In a particular embodiment, a method of identifying mobile communication devices located near an access point is disclosed. The method includes detecting, at a device coupled to a network, a communication transmitted over the network. The method also includes determining whether the communication is associated with an unauthorized data request. When the communication is associated with the unauthorized data request, the method further includes determining an access point associated with a source of the communication. The method also includes transmitting a message to a service provider. The message may request identification of mobile communication devices that are located near the access point (e.g., within a threshold distance of the access point).

In another embodiment, a method of identifying mobile communication devices located near an access point includes receiving a request to identify mobile communication devices located within a threshold distance of an access point. The request may be received at a server of a mobile communication service provider from a detection server. The method includes identifying one or more mobile communication devices located near the access point (e.g., within the threshold distance of the access point). The method also includes transmitting a message to a correlation server via a network. The message may include information identifying the one or more mobile communication devices.

In yet another embodiment, a computer-readable storage device includes instructions that, when executed by a processor, cause the processor to receive first data identifying mobile communication devices that are located within a threshold distance of a first access point. The first access point may be a source of an unauthorized data request. The computer-readable storage device further includes instructions that, when executed by the processor, cause the processor to receive second data identifying mobile communication devices that are located within the threshold distance of the first access point. The computer-readable storage device further includes instructions that, when executed by the processor, cause the processor to identify at least one mobile communication device identified by the first data and the second data. For example, a particular mobile device may be located near an access point at a first during a first unauthorized data request and at a second time during a second unauthorized data request.

Referring to FIG. 1, a particular embodiment of a system 100 for identifying mobile communication devices located near an access point is disclosed. The system 100 includes an access point 102 coupled to a network 104. The access point 102 may be coupled to the network 104 via a wired or wireless connection. The network 104 may be a public network (e.g., the internet) or a private network (e.g., an intranet). The access point 102 may be configured to communicate with one or more electronic devices (e.g., a mobile communication device, a personal computing device, etc.). As shown in FIG. 1, the access point 102 may communicate with a personal computing device 134 (e.g., a laptop or tablet) via a wireless connection 136. The personal computing device 134 may communicate with the access point 102 via the wireless connection 136 using a communication protocol, such as institute of electrical and electronics engineers (IEEE) 802.11x. Additionally, the access point 102 may communicate with mobile communication devices 128, 130 via wireless connections 136. The personal computing device 134 and the mobile communication devices 128, 130 may access the network 104 via the access point 102 using the wireless connections 136. In FIG. 1, a mobile communication device 132 may not be connected to the access point 102 via a wireless connection. For example, a user associated with the mobile communication device 132 may have disabled a wireless connection setting of the mobile communication device 132.

In an embodiment, a content provider 114 may be coupled to the network 104 via a wired or wireless connection. Communications directed to the content provider 114 may be transmitted over the network 104 and received by the content provider 114. For example, electronic devices (e.g., the mobile communication devices 128, 130, the personal computing device 134, etc.) may transmit a communication over the network 104 to the content provider 114 via the access point 102. In response to receiving the communication, the content provider 114 may send data over the network 104 to the electronic device via the access point 102.

In an embodiment, a detection server 110 may be coupled to the network 104 via a wired or wireless connection. The detection server 110 may be configured to monitor communications transmitted over the network 104. Databases 112 may be accessible to the detection server 110. As explained in more detail with reference to FIG. 4, the databases 112 may store information associated with communications of interest (e.g., unauthorized data requests). In an embodiment, the databases 112 may be located remote from the detection server 110 and accessible to the detection server 110 via the network 104. In another embodiment, at least one database 112 is coupled directly to the detection server 110 and at least one other database 112 is accessible to the detection server 110 via the network 104. It should be understood that although the databases 112 are shown in FIG. 1 as being separate from the detection server 110, one or more of the databases 112 may be stored at a storage device of the detection server 110 (e.g., a hard disk drive). Additionally, while FIG. 1 shows only a single detection server 110 coupled to the network 104, more than one detection server 110 may be coupled to the network 104. Information in a database 112 that is accessible to a particular detection server 110 may be accessible to other detection servers 110 via the network 104.

As shown in FIG. 1, a server of a service provider 106 may be coupled to the network 104 via a wired or wireless connection. A subscriber database 120 may be accessible to the server 106. The subscriber database 120 may store information identifying one or more subscribers of the service provider. In an embodiment, the service provider is a mobile communication service provider and the database 120 stores information identifying one or more subscribers to a mobile communication service provided by the mobile communication service provider. The information identifying the one or more subscribers may include device identifiers associated with mobile devices corresponding to each of the one or more subscribers. The device identifiers may include an international mobile equipment identity (IMEI), an international mobile subscriber identity (IMSI), a media access control (MAC) address, a mobile subscriber integrated services digital network (MISDN) number, a subscriber name, a subscriber address, or any combination thereof. For example, mobile communication devices 128, 132, 144 may be associated with one or more mobile communication service subscribers of the mobile communication service provider. The mobile communication devices 128, 132, 144 may communicate with a base station 140 via wireless connections 138 in accordance with one or more communication standards. The one or more communication standards may include code division multiple access (CDMA), time division multiple access (TDMA), frequency division multiple access (FDMA), orthogonal frequency division multiple access (OFDMA), single-carrier frequency division multiple access (SC-FDMA), a global system for mobile communications (GSM), enhanced data rates for GSM evolution (EDGE), evolved EDGE, Universal Mobile Telecommunications System (UMTS), Worldwide Interoperability for Microwave Access (Wi-Max), general packet radio service (GPRS), 3rd generation partnership project (3GPP), 3GPP2, 4th generation (4G), long term evolution (LTE), high speed packet access (HSPA), HSPA+, or any combination thereof.

The service provider 106 may be in communication with a mobile locating system (MLS) 122. The MLS 122 may be configured to provide information that identifies mobile communication devices of subscribers of the service provider that are within a coverage area of a base station.

The service provider 106 may be communicatively coupled to a gateway mobile location center (GLMC) 124. The GLMC 124 may be configured to communicate with the wireless communication devices 128, 132, 144 using wireless connections 138 via the base station 140. In a particular embodiment, the GLMC 124 is configured to send a request to one or more of the communication devices 128, 132, 144. The request may instruct each of the mobile communication devices 128, 132, 144 to provide a global positioning system (GPS) location or coordinates to the GLMC 124. The request may include ephemeris data. In an embodiment, the GLMC 124 may be determine the ephemeris data based on an identified base station (e.g., the base station 140). The ephemeris data may identify GPS satellites accessible to mobile communication devices within a coverage area of the identified base station (e.g., a coverage area of the base station 140).

As shown in FIG. 1, other servers associated with other service providers 108 may also be coupled to the network 104 via wired or wireless connections. In an embodiment, the other service providers 108 may be other mobile communication service providers. Each of the other service providers 108 may include a subscriber database (e.g., the subscriber database 120), an MLS (e.g., the MLS 122), and a GLMC (e.g., the GLMC 124) as explained above. The other subscriber database (not shown) may store information identifying one or more subscribers to other mobile communication services provided by the other mobile communication service provider. For example, mobile communication devices 130, 142 may be associated with one or more other mobile communication service subscribers of the other mobile communication service providers. The mobile communication devices 130, 142 may communicate with the base station 140 or with other base stations of the other service providers 108 via wireless connections 138.

In an embodiment, a correlation server 116 may be connected to the network 104 via a wired or wireless connection. The correlation server 116 may receive one or more lists from one or more service providers (e.g., the service provider 106, the other service providers 108). The one or more lists may be sent to the correlation server 116 from servers of the service provider 106 and the other service providers 108 automatically or in response to a request. In a particular embodiment the request may be sent to the servers of the service provider 106 and the other service providers 108 from the detection server 110 or from another server of the service provider 106 or the other service providers 108.

In an embodiment, the one or more lists received at the correlation server 116 may include information that identifies one or more mobile communication devices (e.g., mobile communication devices 128, 130, 132, 142, 144) that are located proximate to an access point (e.g., the access point 102). A particular mobile communication device (e.g., one of the mobile communication devices 128, 130, 132, 142, 144) may be proximate to the access point 102 when the particular mobile communication device is within a threshold distance 146 of the access point 102. The information may also include data identifying a communication transmitted to the network 104. The communication may have been originated by an electronic device and transmitted to the network 104 via the access point 102. The correlation server 116 may be configured to generate correlation data based on the received one or more lists as will be explained in more detail below.

Figure 2:
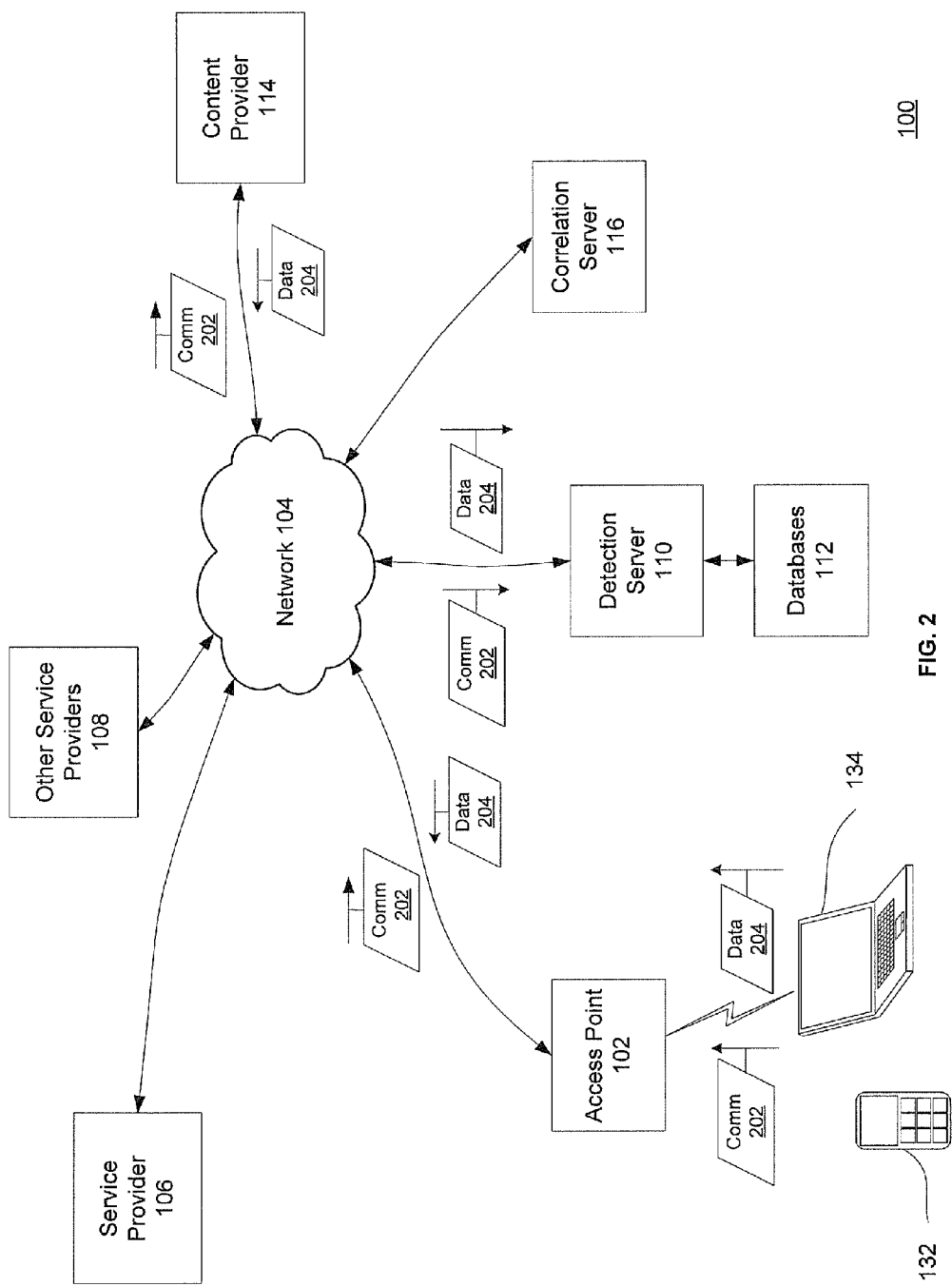
FIG. 2 is a block diagram of another illustrative embodiment of a system to identify mobile communication device.

Referring to FIG. 2, an illustrative embodiment of data flow within the system 100 of FIG. 1 is shown. It should be understood that elements of FIG. 1 that are not included in FIG. 2 have been omitted for simplicity of description. In FIG. 2, the personal computing device 134 and the mobile communication device 132 are shown. The personal computing device 134 and the mobile communication device 132 may be associated with a user.

As shown in FIG. 2, the personal computing device 134 is connected to the access point 102. The user may use the personal computing device 134 to send a communication 202 through the network 104 to a content provider 114 via the access point 102. In an embodiment, the communication 202 may be associated with a request to view a webpage associated with a website. The communication 202 may include a uniform resource identifier (URI) associated with the website (e.g., a uniform resource locator (URL) associated with the website). In another embodiment, the communication 202 may be associated with a request to initiate a data transfer. The data transfer may be associated with a file accessible via the content provider 114.

The communication 202 may be received at a content provider 114. In response to receiving the communication 202, the content provider 114 may transmit data 204 through the network 104 to the personal computing device 134. In a particular embodiment, the data 204 may include website data (e.g., hyper-text markup language (html) code, images, etc.) associated with a webpage of a website. For example, the website may be a government website, a corporate website, an illegal content distribution website, or a pornography website. In another embodiment, the data 204 may be associated with a file. The file may be downloaded from the content provider 114 by an electronic device (e.g., the personal computing device 134) via the network 104. The file may be one of a confidential document, a corporate document, a government document, a copyrighted document, a music file, a video file, and a picture file.

The communication 202 may be intercepted or otherwise detected by a detection server 110 coupled to the network 104. In an embodiment, the communication 202 may be transmitted over the network 104 as one or more packets in accordance with a network protocol (e.g., an internet protocol). The detection server 110 may intercept one or more of the packets transmitted over the network 104. The detection server 110 may be configured to analyze the communication 202 and/or the one or more intercepted packets. For example, the detection server 110 may perform a deep packet inspection of one or more of the intercepted packets. The detection server 110 may analyze an intercepted packet to identify a network address (e.g., an internet protocol address) of a destination of the data request, a type of the data request (e.g., a request to access a webpage, a request to initiate a data transfer, etc.), and a network address (e.g., an internet protocol address) of a source of the communication 202. The intercepted packet may include a plurality of headers and a data field. A first header of the intercepted packet may include the network address of the source of the communication 202. A second header may include the network address of the destination of the communication 202. The data field may include data that identifies the type of the communication 202.

The data 204 transmitted from the content provider 114 to the electronic device (e.g., the personal computing device 134) may be intercepted or otherwise detected by the detection server 110. In an embodiment, the data 204 may be transmitted over the network 104 as one or more packets in accordance with a network protocol (e.g., an internet protocol). The detection server 110 may intercept one or more of the packets transmitted over the network 104. The detection server 110 may be configured to analyze the data 204 and/or the one or more intercepted data packets. For example, during operation the detection server 110 may intercept data 204. The detection server 110 may analyze the data 204 to identify a network address (e.g., an interne protocol address) of a destination of the data 204 (e.g., the access point 102). The detection server 110 may also analyze the data 204 to identify content of the data 204 (e.g., a digital signature), a network address (e.g., an internet protocol address) of a source (e.g., the content provider 114) of the data 204, or both.

During operation, the detection server 110 may detect the communication 202 transmitted over the network 104. The communication 202 may be associated with a data request. The detection server 110 may determine whether the communication 202 is associated with an unauthorized data request. In a particular embodiment, the detection server 110 may use deep packet inspection to identify a network address of a destination of the communication 202 (e.g., the content provider 114), to identify a network address of a source of the communication 202 (e.g., the access point 102), to identify a type of the communication 202, or any combination thereof. The detection server 110 may determine whether information associated with the communication 202 matches an identifier of an unauthorized data request. In a particular embodiment, the type of the communication 202 may be a request to access a webpage. A data field of the communication 202 may include a uniform resource indicator (URI) associated with the webpage (e.g., a uniform resource locator (URL) of the webpage). The detection server 110 may access one or more databases 112 to determine whether the URI (e.g., the URL of the webpage) included in the data field of the data request matches an identifier stored at one of the one or more databases 112. As explained above, and in more detail with reference to FIG. 4, the databases 112 may store information associated with unauthorized data requests.

In another particular embodiment, the type of the communication 202 may be a request to initiate a data transfer. The data transfer may be associated with a particular file. A data field of the communication 202 may include a file identifier (e.g., a filename). The detection server 110 may access one or more databases 112 to determine whether the file identifier included in the data field of the communication 202 matches an identifier stored at one of the one or more databases 112. In a particular embodiment, the detection server 110 may extract the file identifier from a single packet. In another embodiment, the detection server 110 may extract the file identifier from more than one packet. In yet another embodiment, the detection server 110 may determine whether information in the data field matches a portion of the identifier stored at the one or more databases 112.

In response to determining that the communication 202 is associated with an unauthorized data request, the detection server 110 may determine an access point (e.g., the access point 102) where the unauthorized data request originated. The detection server 110 may determine the access point (e.g., the access point 102) based on a network address (e.g., an internet protocol address) of the access point. The detection server 110 may estimate a physical location of the access point based on the network address. Estimating the physical address may include performing a physical address lookup based on the network address. In an embodiment, one of the databases 112 may include data that provides a mapping of network addresses to physical addresses. The detection server 110 may access the data to estimate the physical address of the access point based on the network address. In another embodiment, a lookup server (not shown) may be used to perform the physical address lookup. The lookup server may receive a request from the detection server 110 requesting the physical address of the access point. The request may include the network address of the access point. The lookup server may perform the physical address lookup based on the network address and transmit a response to the detection server 110. The response may include the physical address of the access point. The lookup server may be accessible to the detection server 110 via the network 104. In an embodiment, the lookup server may be associated with a service provider. In an embodiment, the service provider is an internet service provider that provides the access point. In another embodiment, the service provider is a mobile communications service provider that provides the access point. It should be understood that more than one lookup server may be used. For example, a first lookup server may be associated with a first service provider (e.g., service provider 106) and other lookup servers may be associated with other service providers (e.g., other service providers 108). The detection server 110 may send multiple requests to each lookup server to estimate the physical address of the access point.

The detection server 110 may transmit a message to a service provider (e.g., service provider 106). The message may request identification of mobile communication devices that are located within a threshold distance (e.g., threshold distance 146 of FIG. 1) of the access point (e.g., based on the physical address of the access point). The threshold distance may be associated with a defined distance (e.g., 100 meters), a radius associated with a coverage area of the access point (e.g., 50 meters), an arbitrary value determined by an operator of the system 100, or any combination thereof. Additionally or in the alternative, the threshold distance may be determined based on a density of mobile communication devices within the geographic area surrounding the access point.

Figure 3:
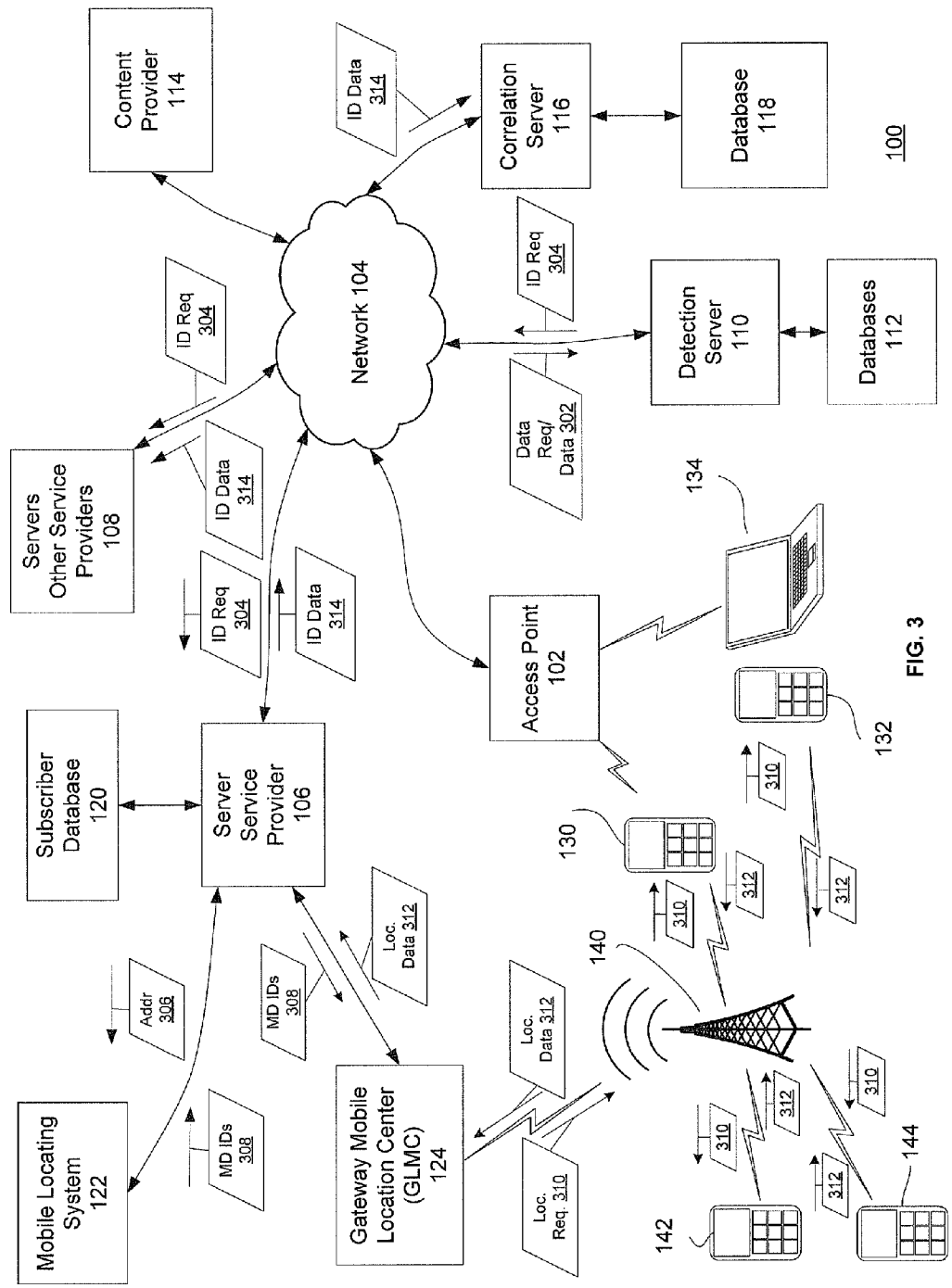
FIG. 3 a block diagram of yet another illustrative embodiment of a system to identify mobile communication device.

Referring to FIG. 3 another illustrative embodiment of data flow within the system 100 of FIG. 1 is shown. It should be understood that elements of FIG. 1 and FIG. 2 that are not included in FIG. 3 have been omitted for simplicity of description. Elements of FIG. 3 that correspond to elements of FIG. 1 are designated with the same number, and it should be understood that elements in FIG. 3 may operate as described with reference to FIG. 1. Further, additional operational features of the elements of FIG. 1 and FIG. 3 are described below.

In FIG. 3, the access point 102 is connected to the network 104. The access point 102 may be connected to one or more electronic devices (e.g., the personal computing device 134 and the mobile communication device 130) via wireless connections. The mobile communication device 132 may not be connected to the access point 102 via a wireless connection. For example, a user associated with the mobile communication device 132 may have disabled a wireless connection setting of the mobile communication device 132. In FIG. 3, the mobile communication device 132 and the personal computing device 134 may be associated with a single user (not shown).

As explained with reference to FIG. 2, the communication 202 may be transmitted from the personal computing device 134 to the content provider 114 over the network 104 via the access point 102. The content provider 114 may receive the communication 202 and in response transmit data 204 to the personal computing device 134 over the network 104. As shown in FIG. 3, the detection server 110 may intercept communication/data 302. The communication/data 302 shown in FIG. 3 may correspond to the communication 202 and/or the data 204 of FIG. 2. As explained with reference to FIG. 2, the communication 202 and/or the data 204 may be transmitted as one or more packets and intercepting the communication 202 and/or the data 204 may include intercepting the one or more packets. In response to intercepting the communication/data 302, the detection server 110 may determine whether the communication/data 302 is associated with an unauthorized data request as explained with reference to FIG. 2 and as explained in more detail with reference to FIG. 4.

In response to determining that the communication/data 302 is associated with an unauthorized data request, the detection server 110 may determine an access point where the unauthorized data request originated. The detection server 110 may determine the access point based on a network address of the access point as explained with reference to FIG. 2. In an embodiment, the detection server 110 may estimate a physical location (e.g., a physical address) of the access point based on the network address of the access point. The detection server 110 may transmit a message to a service provider (e.g., the service provider 106) requesting identification of mobile communication devices that are located within a threshold distance (e.g., the threshold distance 146 of FIG. 1) of the access point (e.g., the access point 102 of FIG. 1). The message may indicate the physical location of the access point. In an embodiment, the message may indicate the network address of the access point and the physical location of the access point may be determined by a service provider in response to receiving the message from the detection server 110.

During operation, the detection server 110 may intercept or otherwise detect the communication/data 302 transmitted over a network 104. The detection server 110 may determine an access point (e.g., the access point 102) where the unauthorized data request originated. The detection server 110 may determine the access point based on a network address of the access point as explained with reference to FIG. 2. The detection server 110 may transmit a message 304 to a service provider (e.g., the service provider 106) requesting identification of mobile communication devices that are located within a threshold distance (e.g., the threshold distance 146 of FIG. 1) of the access point (e.g., the access point 102 of FIG. 1).

The request 304 may be transmitted from the detection server 110 to one or more service providers (e.g., service provider 106 and other service providers 108) over the network 104. The request 304 may be received at a server of a service provider (e.g., server of service provider 106). The request 304 may include a request to identify mobile communication devices located within a threshold distance (e.g., the threshold distance 146 of FIG. 1) of the access point (e.g., the access point 102). In an embodiment, the request 304 identifies a physical location (e.g., a physical address) of the access point (e.g., the access point 102). In another embodiment, the request 304 identifies a network address (e.g., an internet protocol address) of the access point (e.g., the access point 102). As explained above, the service provider may determine the physical location of the access point based on the network address.

The service provider 106 may identify one or more mobile communication devices located within the threshold distance (e.g., the threshold distance 146 of FIG. 1) of the access point. In an embodiment, the service provider 106 may estimate the physical address of the access point based on the network address identified in the request 304. The service provider may identify a base station (e.g., the base station 140) of a mobile communication network associated with the service provider 106. The base station may be associated with a coverage area (not shown). The physical location (e.g., the physical address) of the access point (e.g., the access point 102) may be within the coverage area of the base station 140. The base station 140 may provide a mobile communication service to electronic devices (e.g., the mobile communication devices 128, 132, 144) within the coverage area associated with the base station 140. The service provider 106 may retrieve information associated with a plurality of mobile communication devices located within the coverage are of the base station 140.

For example, the service provider 106 may send an address message 306 to a mobile locating system (MLS) 122. The address message 306 may identify the physical location (e.g., the physical address) of the access point 102. In an embodiment, the MLS 122 may identify the base station (e.g., the base station 140) based on the physical location identified in the address message 306. In another embodiment, the base station (e.g., the base station 140) may be identified by the service provider 106 and may be identified in the address message 306. The MLS 122 may include a database (not shown) that stores information associated with multiple base stations of the service provider 106. For example, the information associated with a base station (e.g., the base station 140) may include information identifying a physical area associated with a coverage area of the base station and information identifying mobile communication devices within the coverage area of the base station (e.g., the mobile communication devices 128, 132, 144).

The MLS 122 may send one or more mobile communication device identifiers 308 to the service provider 106. The mobile communication device identifiers may include an international mobile equipment identity (IMEI), an international mobile subscriber identity (IMSI), a media access control (MAC) address, a mobile subscriber integrated services digital network (MISDN) number, a subscriber name, a subscriber address, or any combination thereof. In response to receiving the one or more mobile communication device identifiers 308, the service provider 106 may send the one or more mobile communication device identifiers 308 to a gateway location center (GLMC) (e.g., the gateway location center 124). In an embodiment, the one or more mobile communication device identifiers 308 may be transmitted to the GLMC 124 along with information identifying a base station (e.g., the base station 140). The GLMC 124 may be configured to communicate with mobile communication devices (e.g., the mobile communication devices 128, 132, 144) associated with a mobile communication service of the service provider 106. In an embodiment, the GLMC 124 may communicate with the mobile communication devices to acquire location data associated with the mobile communication devices.

For example, during operation the GLMC 124 may send a location request 310 to one or more mobile communication devices based on the one or more mobile communication device identifiers 308. The location request 310 may be transmitted to the one or more mobile communication devices via a base station (e.g., the base station 140). The location request 310 may be a request for positioning information associated with each of the one or more mobile communication devices (e.g., the mobile communication devices 128, 132, 144). In an embodiment, the location request 310 may include ephemeris data associated with the coverage area of the base station (e.g., the base station 140). The ephemeris data may include information identifying one or more satellites accessible to the mobile communication devices (e.g., the mobile communication devices 128, 132, 144). The one or more satellites may be identified based on a base station identifier (e.g., an identifier of the base station 140), information associated with a coverage area of a base station (e.g., a coverage area of the base station 140), a physical location (e.g., the physical address of the access point 102), or any combination thereof. In an embodiment, the GLMC 124 may include a database that includes information associated with satellites of a global satellite positioning (GPS) system (not shown). The database may include satellite identifiers of one or more satellites of the GPS system and information associated with an orbit of each of the one or more satellites. In an embodiment, the GLMC 124 may be configured to determine the ephemeris data based on the database that includes the information associated with the satellites of the GPS system. For example, the GLMC 124 may identify the one or more satellites accessible to the mobile communication devices based on the coverage area of the base station (e.g., the base station 140) and the information associated with the orbits of each of the one or more satellites.

The location request 310 may be received at each of the mobile communication devices (e.g., the mobile communication devices 128, 132, 144). In response to receiving the location request 310, a particular mobile communication device (e.g., the mobile communication device 132) may determine a physical location (e.g., GPS coordinates) of the particular mobile communication device. The particular mobile communication device (e.g., the mobile communication device 132) may transmit location data 312 (e.g., the physical location of the particular mobile communication device) to the GLMC 124 via the base station 140. The GLMC 124 may receive the location data 312 from the particular mobile communication device (e.g., the mobile communication device 132). Further, each of the one or more mobile communication devices (e.g., the mobile communication devices 128, 132, 144) may transmit location data 312 to the GLMC 124.

In an embodiment, the GLMC 124 may forward the location data 312 to the service provider 106. In an embodiment, the GLMC 124 may forward the location data 312 in response to receiving location data 312 from each of the one or more mobile communication devices that received the location request 310. In another embodiment, the GLMC 124 may forward the location data 312 as the location data 312 is received from each of the one or more mobile communication devices.

In response to receiving the location data 312 from the GLMC 124, the service provider 106 may determine whether the particular mobile communication device is within a threshold distance (e.g., the threshold distance 146) of the access point (e.g., the access point 102) based on the location data 312. In an alternative embodiment, the GLMC 124 may determine whether each of the particular mobile communication device is within a threshold distance (e.g., the threshold distance 146) of the access point (e.g., the access point 102) based on the location data 312 and transmit information indicating whether each of the particular mobile communication device is within the threshold distance of the access point to the service provider 106.

The service provider 106 may transmit identification data 314 to a correlation server 116 via the network 104. The identification data 314 may include information identifying one or more mobile communication devices (e.g., the mobile communication devices 128, 132) that are within the threshold distance (e.g., the threshold distance 146 of FIG. 1) of the access point (e.g., the access point 102). The identification data 314 may include information identifying each of the one or more mobile communication devices that are within the threshold distance of the access point. For a particular mobile communication device, the identification data 314 may include one or more mobile communication device identifiers (e.g., an international mobile equipment identity (IMEI), an international mobile subscriber identity (IMSI), a media access control (MAC) address, a mobile subscriber integrated services digital network (MISDN) number, or any combination thereof), a location of each of the mobile communication device, a timestamp, information associated with the communication/data 302, or any combination thereof. The identification data 314 may also include a subscriber name, a subscriber address, or both. The subscriber name and the subscriber address may be retrieved by the service provider 106 from the subscriber database 120 in response determining the mobile communication devices located within the threshold distance of the access point. Further description of the contents of the identification data 314 are described with reference to FIG. 5.

In FIG. 3, the other service providers 108 may perform one or more of the operations described above with reference to the service provider 106. For example, the detection server 110 may transmit other requests 304 via the network 104 to other service providers 108. The other service providers 108 may receive the other requests 304 from the detection server 110. In response to receiving the other requests 304, the other service providers 108 may access an MLS, a GLMC, a subscriber database, or any combination thereof to identify other mobile communication devices located within a threshold distance (e.g., the threshold distance 146 of FIG. 1) of an access point (e.g., the access point 102). For example, the mobile communication devices 130, 142 may be associated with a mobile communication service provided by the other service providers 108. The other service providers 108 may determine that the mobile communication device 130 is within the threshold distance 146 of the access point 102. The other service providers 108 may determine that the mobile communication device 142 is not within the threshold distance 146 of the access point 102. The other service providers 108 may transmit other identification data 314 to the correlation server 116 via the network 104. The other identification data 314 may include information identifying the mobile communication device 130.

During operation, the correlation server 116 may receive first data (e.g., the identification data 314) identifying mobile communication devices that are located within a threshold distance of an access point. The correlation server 116 may also receive second data (e.g., the identification data 314) identifying mobile communication devices that are located within the threshold distance of the access point. The correlation server 116 may receive the first data and the second data via a connection to the network 104. The correlation server 116 may store the first data and the second data at a database 118. The correlation server 116 may identify at least one mobile communication device identified by the first data and the second data.

In an embodiment, the first data (e.g., identification data 314) may be received at the correlation server 116 from a mobile communication service provider (e.g., service provider 106) at a first time. The second data (e.g., identification data 314) may be received at the correlation server 116 from the mobile communication service provider (e.g., the service provider 106) at a second time. The correlation server 116 may receive a request from a server associated with an interested party (e.g., the interested party 148). The interested party may be a law enforcement agency or a content provider (e.g., a movie creator/distributor, a music creator/distributor, etc). The request from the server associated with the interested party may be a request for information associated with mobile communication devices located within a threshold distance (e.g., the threshold distance 146 of FIG. 1) of an access point (e.g., the access point 102) when particular communication/data 302 were detected. The correlation server 116 may correlate the first data and the second data to generate correlation data in response to receiving the request from the interested party. The correlation server 116 may identify at least one mobile communication device based on the correlation data. The correlation data may be stored at the database 118. The correlation server 116 may send the correlation data to the server of the interested party 148. In an embodiment, the correlation data may identify a subscriber associated with the mobile communication device 132. The subscriber may also be associated with the electronic device 134 that originated the communication 202. In an alternative embodiment, the correlation server 116 may use the information stored at the database 118 to determine that the subscriber is associated with the mobile communication device 132 and that the subscriber is also associated with the electronic device 134 that received the data 204.

As explained in more detail with reference to FIG. 5, the database 118 may be used by the correlation server to identify a particular mobile communication device (e.g., the mobile communication devices 128, 130, 132) associated with a user of the electronic device (e.g., the personal computing device 134) that originated the communication 202 of FIG. 2. As explained in more detail with reference to FIG. 5, the database 118 may be used by the correlation server to identify a particular mobile communication device (e.g., the mobile communication devices 128, 130, 132) associated with a user of the electronic device (e.g., the personal computing device 134) that received the data 204 of FIG. 2.

Thus, the system 100 of FIG. 1, as further described with reference to FIG. 2 and FIG. 3, is operable to detect an unauthorized data request transmitted over a network (e.g., the network 104) via an access point (e.g., the access point 102). The system 100 is operable to identify mobile communication devices within a threshold distance (e.g., the threshold distance 146) of the access point in response to detecting the unauthorized data request. The system 100 is further operable to store information associated with the identified mobile communication devices. The system 100 is operable to identify a particular mobile communication device that is associated with a user of an electronic device that originated the unauthorized data request based on the stored information associated with the identified mobile communication devices.

Referring to FIG. 4, a particular embodiment of a database for use in identifying mobile communication devices located near a location is shown and is generally designated 400. In an embodiment, the databases 112 of FIG. 1 may include one or more features of the database 400. As shown in FIG. 4 the database 400 includes records 408, 410, 412, 414. Each of the records 408, 410, 412, 414 may include an entry associated with an unauthorized data request type 402, identifiers 404, a notification list 406, or any combination thereof. For example, the record 408 includes an unauthorized data request type 402 (e.g., URL Access 416), an identifier 404 (e.g., URL1 418), and a notification list 406 (e.g., P1 420). The record 410 includes an unauthorized data request type 402 (e.g., Data Transfer 422), an identifier 404 (e.g., DS2 424), and a notification list 406 (e.g., P1, P2 426). The record 412 includes an unauthorized data request type 402 (e.g., Data Transfer 428), an identifier 404 (e.g., DF3 430), and a notification list 406 (e.g., P3 432). The record 414 includes an unauthorized data request type 402 (e.g., Data Transfer 434), an identifier 404 (e.g., DF4 436), and a notification list 406 (e.g., P3 438). Each of the records stored at the database 400 may be associated with a communication that indicates an unauthorized data request.

The unauthorized data request type 402, the identifier 404, and the notification lists 406 may be used by the detection server 110 to determine whether a communication (e.g., a communication 202) is associated with an unauthorized data request. During operation, the detection server 110 may detect a communication transmitted over the network 104. The detection server 110 may determine whether the communication is associated with an unauthorized data request. The detection server 110 may determine a data request type associated with the communication. The data request type may correspond to the unauthorized data request type 402 of one or more records 408, 410, 412, 414 of the database 400. The unauthorized data request type 402 may identify a request to access a webpage, a request to initiate a data transfer, or any combination thereof. The detection server 110 may determine whether information associated with the communication matches an identifier of an unauthorized data request (e.g., the identifiers 404). The detection server 110 may also determine whether to notify an interested party (e.g., the interested party 148) of the unauthorized data request. The identifiers 404 may include a digital signature of a file, a digital fingerprint of the file, a watermark of the file, a filename, or any combination thereof. Additionally or in the alternative, the identifiers 404 may include a uniform resource locator (URL) associated with a webpage.

For example, the detection server 110 may detect the communication 202 transmitted over the network 104. As explained above, the detection server 110 may use deep packet inspection to identify a network address (e.g., an internet protocol address) of a destination of the communication 202 (e.g., content provider 114), a network address of a source of the communication 202 (e.g., access point 102), and a type of the communication 202 (e.g., a request to access a webpage).

In an embodiment, the detection server 110 may determine that the communication 202 is associated with a request to access a webpage. The detection server 110 may compare data extracted from the communication 202 to the record 408 which is based on URL Access 416 because the type of the communication 202 and the type 402 of record 408 are associated with requests to access a webpage. The detection server 110 may determine whether data extracted from the communication 202 (e.g., destination address, source address, or information in the data field) matches an identifier 404 of record 408 (e.g., URL1 418). In response to determining that the data extracted from the communication 202 matches the identifier 404 of the record 408 (e.g., the communication 202 is a request to access a webpage identified by URL1 418), the detection server 110 may send the request 304 to one or more service providers as explained with reference to FIG. 3. Additionally, the detection server 110 may transmit a notification message to network addresses identified in the notification list 406 of the record 408 (e.g., P1 420). The notification message may inform an interested party (e.g., the interested party 148) that an unauthorized data request has been identified. As explained below, the interested party may be associated with the subject matter of the unauthorized data request.

In another embodiment, the detection server 110 may determine that the communication 202 is associated with a request to initiate a data transfer. The detection server 110 may identify records the 410, 412, 414 as being associated with requests to initiate a data transfer based on the unauthorized data request type 402 associated with each of the records 410, 412, 414 (e.g., Data Transfer 422, Data Transfer 428, Data Transfer 434). The detection server 110 may determine whether data extracted from the communication 202 (e.g., destination address, source address, or information in the data field) matches the identifier 404 of one of the records 410, 412, 414 (e.g., Data Transfer 422, Data Transfer 428, Data Transfer 434). For example, the communication 202 may include a filename associated with the request to initiate a data transfer. The detection server 110 may determine whether one of the identifiers 404 of the records 410, 412, 414 matches the filename associated with the communication 202. In response to determining that the data extracted from the communication 202 matches the identifier 404 of the record 412 (e.g., the filename matches DF3 430), the detection server 110 may send the request 304 to one or more service providers as explained with reference to FIG. 3. Additionally, the detection server 110 may transmit a notification message to network addresses identified in the notification list 406 of the record 412 (e.g., P3 432).

In an embodiment, the notification message may inform an interested party (e.g., interested party 148) that an unauthorized data request has been identified. In an embodiment, the interested party may be a music distributor and the request to initiate the data transfer may be associated with downloading a music file owned by the music distributor. The notification message may include a source of the communication 202 (e.g., access point 102), a timestamp, an identifier 404 (e.g., a file name), and other information that may be used by the interested party to identify the communication 202. The notification message may be used by the interested party to identify a user associated with an electronic device that originated the communication 202 as explained with reference to FIG. 3. For example, the interested party may send a request to a correlation server 116 requesting identification of one or more mobile communication devices located within a threshold distance of an access point where the communication 202 originated.

In another embodiment, the detection server 110 may determine that the communication 202 is associated with a request to initiate a data transfer. The detection server 110 may identify the records 410, 412, 414 as being associated with requests to initiate a data transfer based on the unauthorized data request type 402 associated with each of the records 410, 412, 414 (e.g., Data Transfer 422, Data Transfer 428, Data Transfer 434). The detection server 110 may determine whether data extracted from the communication 202 (e.g., a destination address, a source address, or information in the data field) matches the identifier 404 of one of the records 410, 412, 414 (e.g., Data Transfer 422, Data Transfer 428, Data Transfer 434). For example, the communication 202 may include a filename associated with the request to initiate a data transfer. The detection server 110 may determine whether one of the identifiers 404 of the records 410, 412, 414 matches the filename associated with the communication 202.

In response to determining that the data extracted from the communication 202 matches the identifier 404 of the record 412 (e.g., the filename matches DF3 430), the detection server 110 may determine whether an address (e.g., the destination address or the source address) extracted from the communication 202 matches a network address identified by the identifier 404 of the record 412. For example, the detection server 110 may detect a first request to initiate a first file transfer from a first server. The first file transfer may be associated with a first movie (e.g., movie X) and the first server may be associated with a movie distribution company. A network address of the first server may not be included in the identifier 404 of the record 412. The detection server 110 may detect a second request to initiate a second file transfer from a second server. The second file transfer may be associated with the first movie and the second server may be associated with a peer-to-peer sharing service (e.g., Limewire). A network address associated with the second server may identified in the identifier 404 of the record 412. The detection server 110 may not send an identification request 304 in response to detecting the first request to initiate a file transfer. However, the detection server 110 may send the identification request 304 to one or more service providers as explained with reference to FIG. 3, in response to detecting the second request to initiate a second file transfer. Additionally, the detection server 110 may transmit a notification message to network addresses identified in the notification list 406 of the record 412 (e.g., P3 432). Thus, the detection server 110 is able to detect unauthorized data transfers based on an identification of a server or webpage that is accessed during a file transfer.

In another embodiment, the detection server 110 may detect the data 204. The detection server 110 may determine that the data 204 is associated with an unauthorized data request (e.g., a data transfer). The detection server 110 may identify the records 410, 412, 414 as being associated with requests to initiate a data transfer based on the unauthorized data request type 402 associated with each of the records 410, 412, 414 (e.g., Data Transfer 422, Data Transfer 428, Data Transfer 434). The detection server 110 may determine whether data extracted from the data 204 (e.g., a destination address, a source address, or information in the data field) matches the identifier 404 of one of the records 410, 412, 414 (e.g., Data Transfer 422, Data Transfer 428, Data Transfer 434). For example, the data 204 may include one or more file identifiers (e.g., a digital signature of a file, a digital fingerprint of the file, a watermark of the file, and a filename). The detection server 110 may determine whether one of the identifiers 404 of the records 410, 412, 414 matches the file identifiers included in the data 204. In another example, the detection server 110 may process the data 204 (e.g., via a hash algorithm) to determine a digital fingerprint of the data 204. The detection server 110 may compare the determined digital fingerprint to the identifier 404 of the records 410, 412, 414. In response to determining that the digital fingerprint of the data 204 matches one of the identifiers 404 of one of the records 410, 412, 414, the detection server 110 may send the identification request 304 to the service providers 106, 108. The detection server 110 may also send the notification message to the network addresses identified in the notification list 406 of the record that includes the identifier 404 that matches the digital fingerprint of the data 204.

Referring to FIG. 5, another illustrative embodiment of a database for use in identifying mobile communication devices near a location is shown and is generally designated 500. In an embodiment, the database 118 of FIG. 1 may include one or more features of the database 500. The database 500 includes records 512, 514, 516, 518, 520. Each of the records 512, 514, 516, 518, 520 includes information associated with an unauthorized data request identifier 502, a list of proximate mobile devices 504, a timestamp 506, a location 508, and correlation data 510. For example, the record 512 includes an unauthorized data request identifier 502 (e.g., URL1 522), a list of proximate mobile device 504 (e.g., list 524 identifying mobile communication devices M1, M2, M3, M4), a timestamp 506 (e.g., T1 526), a location 508 (e.g., L1 528), and correlation data 510 (e.g., CD1 530). The record 514 includes an unauthorized data request identifier 502 (e.g., URL1 532), a list of proximate mobile device 504 (e.g., list 534 identifying mobile communication devices M4, M7, M9), a timestamp 506 (e.g., T2 536), a location 508 (e.g., L1 538), and correlation data 510 (e.g., CD2 540). The record 516 includes an unauthorized data request identifier 502 (e.g., DS2 542), a list of proximate mobile device 504 (e.g., list 544 identifying mobile communication devices M5, M9, M10), a timestamp 506 (e.g., T3 546), a location 508 (e.g., L2 548), and correlation data 510 (e.g., CD3 550). The record 518 includes an unauthorized data request identifier 502 (e.g., DS2 552), a list of proximate mobile device 504 (e.g., list 554 identifying mobile communication devices M10, M11, M12, M14), a timestamp 506 (e.g., T4 556), a location 508 (e.g., L3 558), and correlation data 510 (e.g., CD4 560). The record 520 includes an unauthorized data request identifier 502 (e.g., URL2 562), a list of proximate mobile communication devices 504 (e.g., list 564 identifying mobile communication devices M13, M15, M16), a timestamp 506 (e.g., T2 566), a location 508 (e.g., L4 568), and correlation data 510 (e.g., CD5 570).

Each of the unauthorized data request identifiers 502 may correspond to the identifier 404 of the database 400 (e.g., the databases 112) of FIG. 4. Each list of proximate mobile communication devices 504 may include an international mobile equipment identity (IMEI), an international mobile subscriber identity (IMSI), a media access control (MAC) address, a mobile subscriber integrated services digital network (MISDN) number, a subscriber name, a subscriber address, or any combination thereof for each included mobile communication device that is determined to be located proximate to a source of the unauthorized data request. The timestamp 506 may be associated with a time when an associated unauthorized data request was detected, a time when the unauthorized data request was initiated, or any combination thereof. The time when the unauthorized data request was detected or initiated may be determined by the detection server 110 during analysis of the communication 202 or the data 204 and included in the identification request 304 and the identification data 314. The timestamp 506 may also include the date the unauthorized data request was detected or initiated. The location 508 may include the location data 312 for each mobile communication device identified in the list of proximate mobile communication devices 504. The location 508 may also include the physical address of a network access point that was identified as a source of the unauthorized data request. The correlation data 510 may include information identifying one or more mobile communication devices that are associated with subscribers. The correlation data 510 may indicate that at least one of the subscribers associated with the one or more identified mobile communication devices is likely to be a user of an electronic device that originated the unauthorized data request via the access point.

As explained above, the correlation server 116 may receive identification data 314 from the service provider 106 and the other service providers 108. The correlation server may store the identification data in the database 118. In an embodiment, the database 118 may include the information stored at the database 500 of FIG. 5. In a particular embodiment, each of the records 512, 514, 516, 518, 520 may correspond to identification data 314 received from a particular service provider. For example, the record 512 may be associated with the identification data 314 received from the service provider 106, and the record 514 may be associated with the identification data 314 received from one of the other service providers 108. The correlation server 116 may store the identification data 314 received from the service provider 106 as a first record (e.g., the record 512) at the database 500. The correlation server 116 may store the identification information 314 received from one of the other service providers 108 as a second record (e.g., the record 514) at the database 500.

In another embodiment, the correlation server 116 may receive the first identification data 314 from the service provider 106 and the second identification data 314 from one of the other service providers 108. Prior to storing the first identification data 314 and the second identification data 314, the correlation server 116 may combine the first identification data 314 and the second identification data 314 to produce combined identification data 314 (e.g., the record 512). For example, the first identification data 314 may include a first list of proximate mobile communication devices 504 that identifies one or more mobile communication devices (e.g., M1, M2, M4) and the second identification data 314 may include a second list of proximate mobile communication devices 504 that identifies one or more mobile communication devices (e.g, M3). The correlation server 116 may combine the first list of proximate mobile communication devices 504 and the second list of proximate mobile communication devices 504 to generate the list of proximate mobile communication devices 524 of the record 512. The correlation server 116 may store the combined identification data 314 as a record (e.g., the record 512) at the database 500.

As explained above, the correlation server 116 may access the database 500 to identify a particular mobile communication device (e.g., the mobile communication devices 128, 130, 132) associated with a user of the electronic device (e.g., the personal computing device 134) that originated the communication 202 of FIG. 2. For example, the correlation server 116 may access the database 500 to identify a mobile communication device associated with a user of an electronic device that originated an unauthorized data request. The correlation server 116 may access the database 500 in response to receiving a request to identify mobile devices located within a threshold distance of an access point. The request may be received from an interested party (e.g., the interested party 148 of FIG. 1). The request may be generated by the interested party in response to receiving the notification message from the detection server 110.

In an embodiment, the correlation server 116 may identify an event of interest (i.e., a particular unauthorized data request) based on information included in the notification message received from the interested party. In another embodiment, the correlation server 116 may identify an event of interest in response to receiving identification information 314 from a service provider. In response to identifying the event of interest, the correlation server 116 may perform a correlation using the records stored at the database 500. For example, the correlation server 116 may identify an event of interest as an unauthorized data request associated with accessing a webpage. The webpage may be identified by an identifier (e.g., URL1 418 of FIG. 4). The correlation server 116 may perform a search of the records stored at the database 500 to identify records associated with the identifier. For example, the correlation server 116 may search the database 500 for records associated with URL1 418. The search may include a search of the records 512, 514, 516, 518, 520 for records that include an unauthorized data request identifier 502 that matches URL1 418. The correlation server 116 may receive search results associated with unauthorized data requests for URL 1 418. For example, the search results may include the record 512 and the record 514. As seen in FIG. 5, the unauthorized data request identifier 502 associated with the record 512 is URL1 522, and the unauthorized data request identifier 502 associated with the record 514 is URL1 532.

The correlation server 116 may identify mobile communication devices included in the records 512 and 514. For example, the record 512 includes the list of mobile communication devices 524. The list of mobile communication devices 524 includes device identifiers associated with a plurality of mobile communication devices M1, M2, M3, M4. Additionally, the list of mobile communication devices 524 may indicate that the plurality of mobile communication devices M1, M2, M3, M4 were within a threshold distance of an access point (e.g., access point 102) when the unauthorized data request associated with URL1 522 occurred. Record 512 also includes a timestamp T1 526.

The correlation server 116 may analyze the search results (e.g., the records 512, 514) to identify one or more particular mobile communication devices (e.g., the mobile communication devices 128, 130, 132) associated with the user of the electronic device (e.g., the personal computing device 134) that originated the communication 202 of FIG. 2. For example, the correlation server 116 may determine that a mobile communication device M4 was identified as being located within the threshold distance 146 of the access point 102 in response to unauthorized data request URL1 522 and in response to unauthorized data request URL1 532. Because mobile communication device M4 was identified as being within the threshold distance 146 of the access point 102 in response to detection of the unauthorized data requests URL1 522, URL1 532, correlation server 116 may determine that a subscriber associated with mobile communication device M4 is the user of the personal computing device 134 that originated the unauthorized data requests URL1 522, URL1 532. In an embodiment, in response to identifying mobile communication device M4, the correlation server 116 may send a notification message to the interested party 148. In another embodiment, the correlation server 116 may store correlation data indicating that mobile communication device M4 has been identified as associated with the unauthorized data requests URL1 522, URL1 532.

Additionally, the correlation server 116 may access the database 500 to identify a particular mobile communication device (e.g., the mobile communication devices 128, 130, 132) associated with a user of the electronic device (e.g., the personal computing device 134) that sent the communication 202 or received the data 204 of FIG. 2 from the access point 102, and that sent additional communications 202 or received data 204 from additional access point (not shown). For example, the correlation server 116 may perform a search of the database 500 for mobile communication devices that were identified as being located with the threshold distance 146 of a first access point after detection of a first occurrence of an unauthorized data request, and for mobile communication devices that were identified as being located with the threshold distance 146 of a second access point after detection of a second occurrence of the unauthorized data request. The first unauthorized data request and the second unauthorized data request may be associated with an unauthorized data request identifier 502 (e.g., DS2 542, DS2 552).

The search may return search results that include the records 516, 518. The correlation server 116 may analyze the search results (e.g., the records 516, 518) to identify one or more particular mobile communication devices (e.g., the mobile communication devices 128, 130, 132) associated with the user of the electronic device (e.g., the personal computing device 134) that originated the communication 202 of FIG. 2 or that received the data 204 associated with the first unauthorized data request and the second unauthorized data request. For example, the correlation server 116 may determine that a mobile communication device M10 was identified as being located within the threshold distance 146 of the first access point (e.g., access point 102) in response to unauthorized data request DS2 542. The correlation server 116 may determine that unauthorized data request DS2 542 originated from the first access point (e.g., access point 102) based on location data 508 included in the record 516 (e.g., L2 548). The correlation server 116 may determine that the mobile communication device M10 was identified as being located within the threshold distance 146 of the second access point (not shown) in response to unauthorized data request DS2 542. The correlation server 116 may determine that unauthorized data request DS2 542 originated from the second access point (not shown) based on location data 508 included in the record 518 (e.g., L3 558). Because the mobile communication device M10 was identified as being within the threshold distance 146 of the first access point in response to detection of the unauthorized data requests DS2 542, and because the mobile communication device M10 was identified as being within the threshold distance 146 of the second access point in response to detection of the unauthorized data requests DS2 552, the correlation server 116 may determine that a subscriber associated with the mobile communication device M10 is the user of the personal computing device 134 that originated the unauthorized data requests DS2 552, DS2 552. In an embodiment, in response to identifying mobile communication device M10, the correlation server 116 may send a notification message to the interested party 148. In another embodiment, the correlation server 116 may store correlation data indicating that mobile communication device M10 has been identified as associated with the unauthorized data requests DS2 552, DS2 552.

Thus, the database 500 may be used by the correlation server 116 to identify a particular mobile communication device (e.g., the mobile communication devices 128, 130, 132) associated with a user of the electronic device (e.g., the personal computing device 134) that sent the communication 202 of FIG. 2 or that received the data 204 of FIG. 2. Further, the database 500 may be used by the correlation server 116 to identify the particular mobile communication device associated with the user that sent or received multiple unauthorized data requests even when the unauthorized data requests originated from different locations (e.g., different access points).

Figure 6:
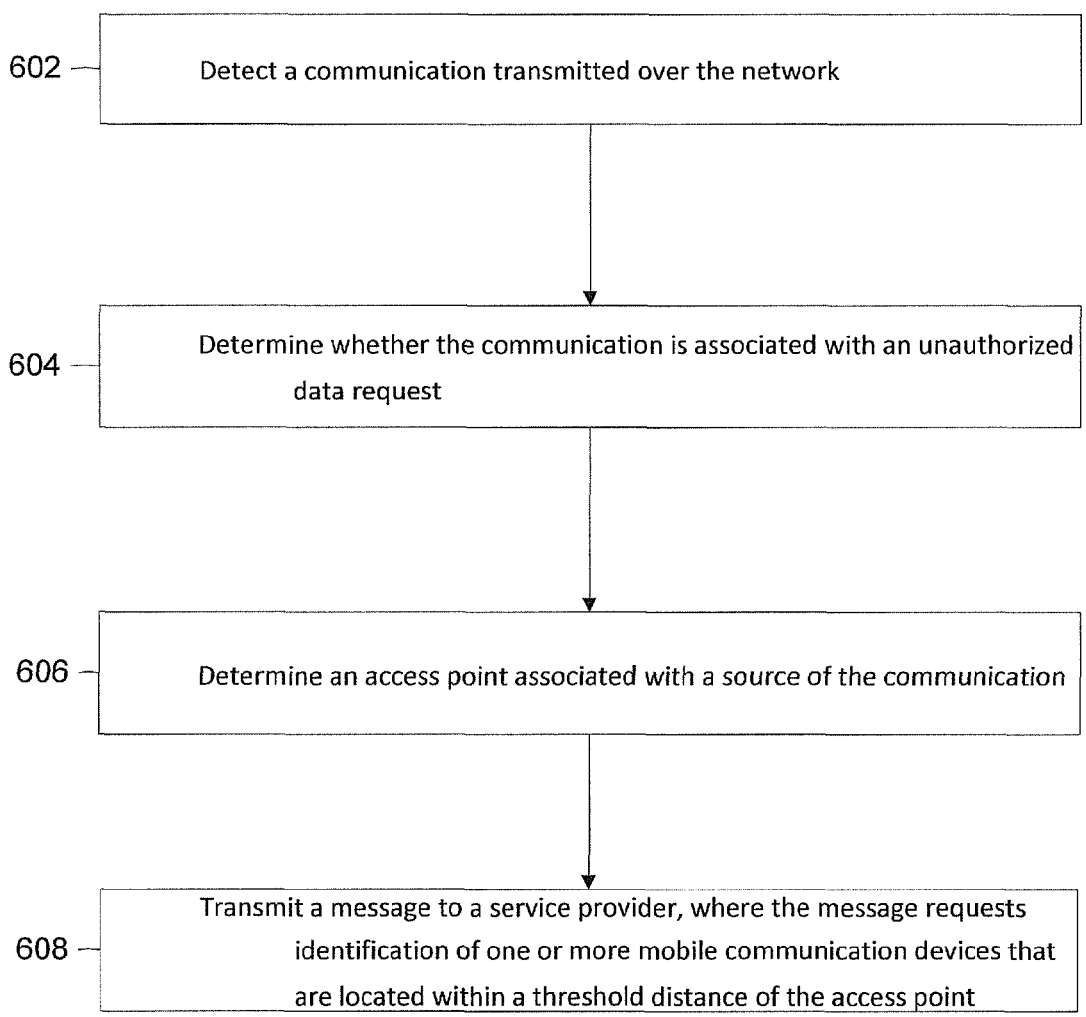
FIG. 6 is a flow chart of a particular embodiment of a method of identifying mobile communication devices near a location.

Referring to FIG. 6, a particular illustrative embodiment of a method of identifying mobile devices is illustrated and generally designated 600. In a particular embodiment, the method 600 may be performed by or using the detection server 110 of FIGS. 1-3. The method 600 begins at 602 by detecting a communication transmitted over a network. In an embodiment the communication is detected by the detection server 110 connected to the network 104. At 604, the method includes determining whether the communication is associated with an unauthorized data request. The detection server 110 may determine whether the communication is associated with an unauthorized data request as described above with reference to FIGS. 1-4. The method may continue, at 606, by determining an access point associated with a source of the communication. At 608, the method includes transmitting a message to a service provider. The message may request identification of mobile communication devices that are located within a threshold distance of the access point.

Figure 7:
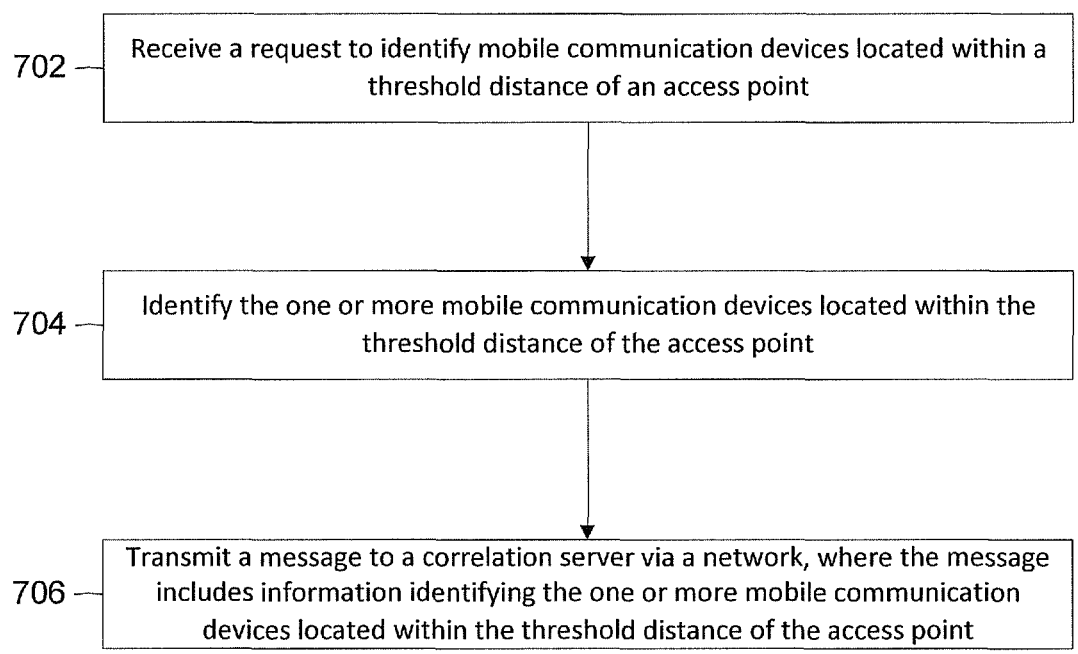
FIG. 7 is a flow chart of another particular embodiment of a method of identifying mobile communication devices near a location.

Referring to FIG. 7 a particular embodiment of the method of identifying mobile devices is illustrated and generally designated 700. For example, the method 700 may be performed by a server associated with the service provider 106, associated with the other service providers 108 of FIG. 1-3, or a combination of servers. The method 700 begins, at 702, by receiving a request to identify mobile communication devices located within a threshold distance of an access point. At 704, the method 700 includes identifying one or more mobile communication devices located within the threshold distance of the access point. At 706, the method 700 includes transmitting a message to a correlation server via a network. The message may include information identifying the one or more mobile communication devices.

Figure 8:
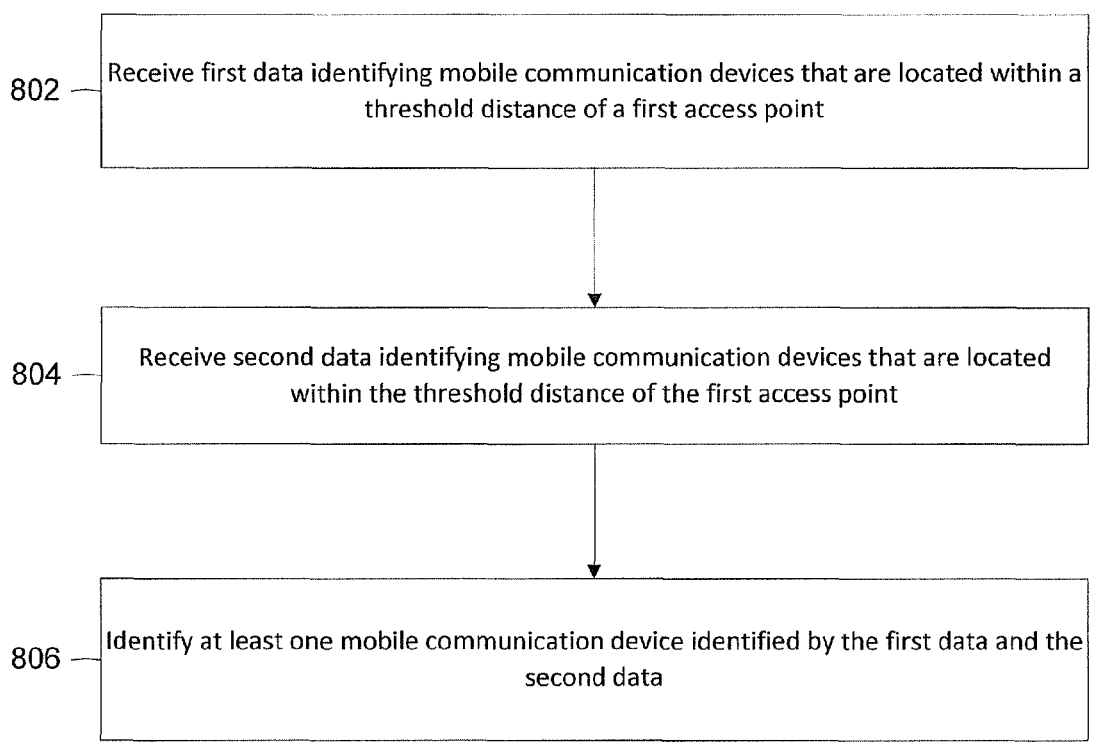
FIG. 8 is a flow chart of another particular embodiment of a method of identifying mobile communication devices.

Referring to FIG. 8, a particular illustrative embodiment of a method of identifying mobile devices is described and generally designated 800. The method 800 may be performed by the correlation server 116 of FIGS. 1-3 and FIG. 5. At 802, the method 800 may include receiving first data identifying mobile communication devices that are located within a threshold distance of a first access point. The method 800 further includes receiving second data identifying mobile communication devices that are located within the threshold distance of the first access point, at 804. At 806, the method 800 also includes identifying at least one mobile communication device identified by the first data and the second data.

Figure 9:
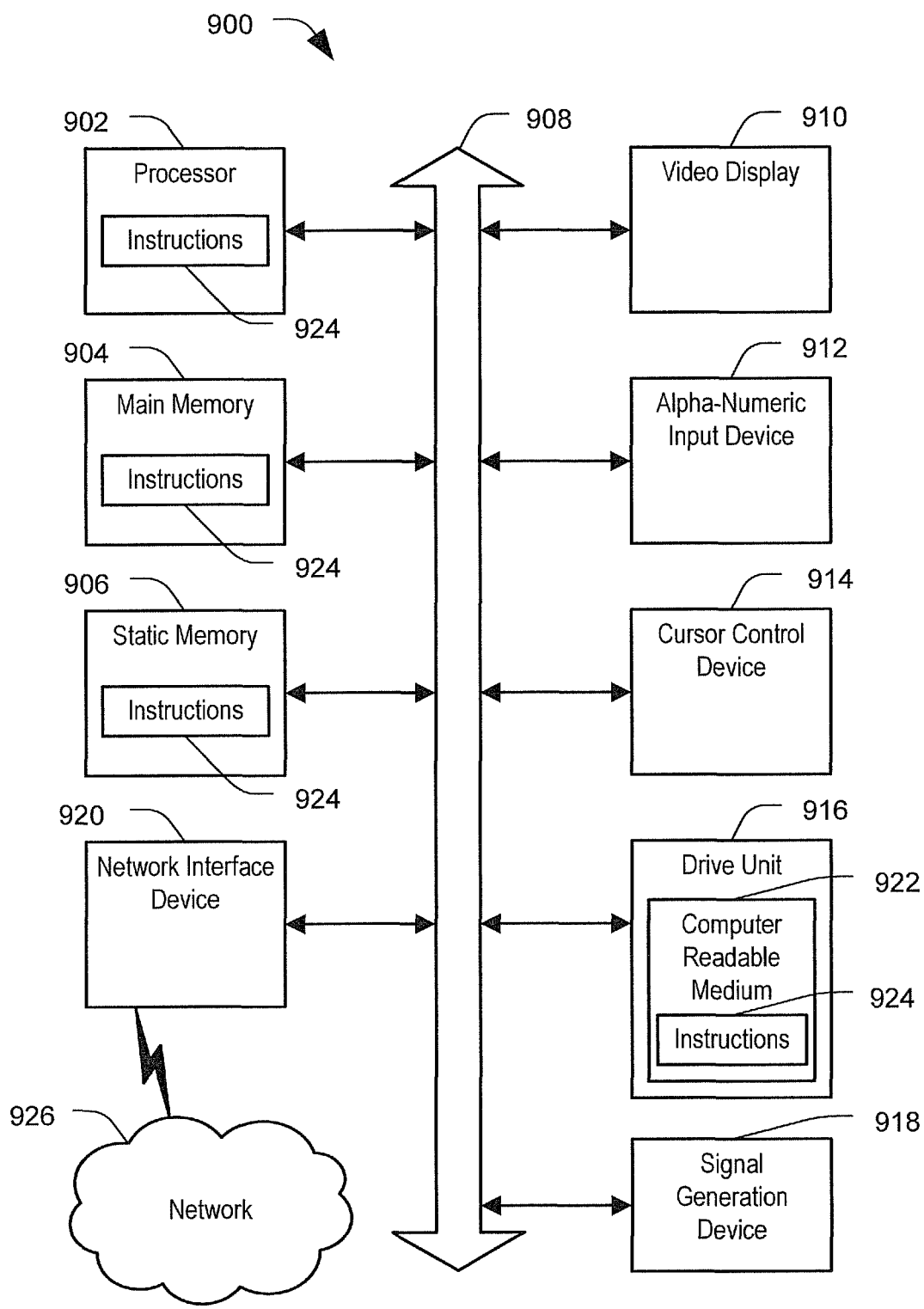
FIG. 9 is a block diagram of an illustrative embodiment of a computer system operable to support the various methods, systems, and computer readable media disclosed with respect to FIGS. 1-8.

Referring to FIG. 9, an illustrative embodiment of a computer system is shown and designated 900. The computer system 900 can include a set of instructions that can be executed to cause the computer system 900 to perform any one or more of the methods or computer based functions disclosed herein. The computer system 900 may operate as a standalone device or may be connected, e.g., using a network, to other computer systems or peripheral devices. For example, the computer system 900 or portions thereof may implement, include, or be included within any one or more of the devices, access point, servers, and databases illustrated in FIGS. 1-5.

In a networked deployment, the computer system 900 may operate in the capacity of a server or as a client user computer in a server-client user network environment, or as a peer computer system in a distributed peer-to-peer or network environment. The computer system 900 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a personal trusted device, a web appliance, a network router, switch or bridge, or any other machine capable of executing a set of instructions (sequential or otherwise) that specify actions to be taken by that machine. In a particular embodiment, the computer system 900 can be implemented using electronic devices that provide voice, video or data communication. Further, while a single computer system 900 is illustrated, the term "system" shall also be taken to include any collection of systems or sub-systems that individually or jointly execute a set, or multiple sets, of instructions to perform one or more computer functions.

As illustrated in FIG. 9, the computer system 900 may include a processor 902, e.g., a central processing unit (CPU), a graphics processing unit (GPU), or both. Moreover, the computer system 900 can include a main memory 904 and a static memory 906 that can communicate with each other via a bus 908. As shown, the computer system 900 may further include a video display unit 910, such as a liquid crystal display (LCD), an organic light emitting diode (OLED), a flat panel display, or a solid state display. Additionally, the computer system 900 may include an input device 912, such as a keyboard, and a cursor control device 914, such as a mouse. Such input devices may enable interaction with various GUIs and GUI controls. The computer system 900 can also include a disk drive unit 916, a signal generation device 918, such as a speaker or remote control, and a network interface device 920.

In a particular embodiment, as depicted in FIG. 9, the disk drive unit 916 may include a computer-readable medium 922 in which one or more sets of instructions 924, e.g. software, can be embedded. Further, the instructions 924 may embody one or more of the methods or logic as described herein, such as the methods described with reference to FIGS. 6-8. In a particular embodiment, the instructions 924 may reside completely, or at least partially, within the main memory 904, the static memory 906, and/or within the processor 902 during execution by the computer system 900. The main memory 904 and the processor 902 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 924 so that a device connected to a network 926 can communicate voice, video or data over the network 926. Further, the instructions 924 may be transmitted or received over the network 926 via the network interface device 920.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any non-transitory medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for communication include TCP/IP, UDP/IP, HTTP, CDMA, TDMA, FDMA, OFDMA, SC-FDMA, GSM, EDGE, evolved EDGE, UMTS, Wi-Max, GPRS, 3GPP, 3GPP2, 4G, LTE, high speed packet access (HSPA), HSPA+, and 802.11x. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method comprising:
   receiving, at a server of a mobile communication service provider from a detection server, a request to identify mobile communication devices located within a threshold distance of an access point, the request sent by the detection server in response to detection of an unauthorized data request associated with the access point, wherein the request includes a network address of the access point;
   estimating a location of the access point based on the network address;
   retrieving information associated with a plurality of mobile communication devices located within a coverage area of a base station of the mobile communication service provider, wherein the location of the access point is within the coverage area of the base station;
   sending a location query to each of the plurality of mobile communication devices within the coverage area of the base station, wherein a particular location query requests positioning information from a particular mobile communication device;
   identifying a mobile communication device of the plurality of mobile communication devices within the coverage area of the base station located within the threshold distance of the access point; and
   transmitting a message to a correlation server via a network, wherein the message includes information identifying the mobile communication device.

2. The method of claim 1, wherein the location query includes ephemeris data associated with the coverage area of the base station.

3. The method of claim 1, further comprising:
   receiving a response to the location query from the particular mobile communication device, wherein the response includes location data associated with a location of the particular mobile communication device; and
   determining, based on the location data, whether the particular mobile communication device is located within the threshold distance of the access point.

4. The method of claim 1, wherein the message includes a list of subscribers, and wherein a subscriber in the list of subscribers is associated with the mobile communication device located within the threshold distance of the access point.

5. The method of claim 1, further comprising:
   receiving, at the server of the mobile communication service provider from the detection server, a second request to identify an additional mobile communication device located within a second threshold distance of an additional access point;
   identifying the additional mobile communication device located within the second threshold distance of the additional access point; and
   transmitting a second message to the correlation server via the network, wherein the second message includes information identifying the additional mobile communication device located within the second threshold distance of the additional access point.

6. A computer-readable storage device comprising instructions that, when executed by a processor, cause the processor to perform operations including:
   receiving first data identifying mobile communication devices located within a threshold distance of a first access point in response to detection by a detection server of a first unauthorized data request associated with the first access point, wherein the first data is received from a mobile communication service provider at a first time;
   receiving second data identifying mobile communication devices located within the threshold distance of the first access point in response to detection by the detection server of a second unauthorized data request associated with the first access point, wherein the second data is received from the mobile communication service provider at a second time;
   correlating the first data and the second data to generate correlation data;
   storing the correlation data at a database; and
   identifying a mobile communication device identified by the first data and the second data based on the correlation data.

7. The computer-readable storage device of claim 6, wherein the operations further include:
   receiving, from a server, a request for information associated with mobile communication devices located within the threshold distance of the first access point; and
   sending the correlation data to the server.

8. The computer-readable storage device of claim 7, wherein the server is associated with a law enforcement agency or a content provider.

9. The computer-readable storage device of claim 6, wherein the first data includes an identifier of an unauthorized data request, an identifier of the mobile communication device, a timestamp, a location, a uniform resource identifier, or any combination thereof.

10. The computer-readable storage device of claim 6, wherein the first access point is identified as a source of an unauthorized data request.

11. The computer-readable storage device of claim 10, wherein the first access point is a wireless data communication access point that complies with an institute of electrical and electronics engineers wireless communication standard.

12. The computer-readable storage device of claim 6, wherein the first data is received from a first mobile communication service provider, and wherein the second data is received from a second mobile communication service provider.

13. A system comprising:
a processor; and
a memory accessible to the processor, the memory comprising instructions executable by the processor to perform operations including:
receiving a request to identify mobile communication devices located within a threshold distance of an access point from a detection server in response to detection of a first unauthorized data request associated with the access point;
identifying a mobile communication device located within the threshold distance of the access point; and
transmitting a message to a correlation server via a network, wherein the message includes information identifying the mobile communication device, wherein the correlation server generates first correlation data that indicates that the mobile communication device was identified as being located near the access point at multiple times when unauthorized data requests associated with the access point occurred, and wherein the correlation server generates second correlation data that indicates that a particular mobile communication device was identified as being located proximate to a plurality of access points when a second set of multiple unauthorized data requests associated with the plurality of access points occurred.

14. The system of claim 13, wherein the request includes a network address of the access point.

15. The system of claim 13, wherein the correlation server is configured to send the first correlation data to a party.

16. The system of claim 13, wherein the message includes a list of subscribers, and wherein a subscriber in the list of subscribers is associated with the mobile communication device.

17. The system of claim 13, wherein the access point provides internet access other than internet access via a base station of a mobile telecommunication network associated with a mobile communication network service provider.

18. The system of claim 13, wherein the mobile communication device is not a source of the first unauthorized data request.

19. The system of claim 13, wherein the message includes an identifier of the unauthorized data request, a timestamp, a location, a uniform resource identifier, or combinations thereof.

20. The system of claim 13, wherein the mobile communication device is identified as located within the threshold distance by a location of the mobile communication device based on global positioning system data received from the mobile communication device.

21. A method comprising:
receiving, at a server of a mobile communication service provider from a detection server, a request to identify mobile communication devices located within a threshold distance of an access point, the request sent by the detection server in response to detection of an unauthorized data request associated with the access point;
identifying a mobile communication device located within the threshold distance of the access point;
transmitting a message to a correlation server via a network, wherein the message includes information identifying the mobile communication device;
receiving, at the server of the mobile communication service provider from the detection server, a second request to identify an additional mobile communication device located within a second threshold distance of an additional access point;
identifying the additional mobile communication device located within the second threshold distance of the additional access point; and
transmitting a second message to the correlation server via the network, wherein the second message includes information identifying the additional mobile communication device located within the second threshold distance of the additional access point.

22. The method of claim 21, further comprising:
estimating a physical address of the access point based on a network address of the access point included in the request; and
retrieving information associated with a plurality of mobile communication devices located within a coverage area of a base station of the mobile communication service provider, wherein the physical address of the access point is within the coverage area of the base station.

23. The method of claim 21, wherein the message includes a list of subscribers, and wherein a subscriber in the list of subscribers is associated with the mobile communication device located within the threshold distance of the access point.

* * * * *